United States Patent [19]

Safdari

[11] 4,019,494
[45] Apr. 26, 1977

[54] SOLAR AIR HEATER ASSEMBLY
[76] Inventor: Yahya B. Safdari, 610 E. Center, Eureka, Ill. 61530
[22] Filed: Aug. 11, 1976
[21] Appl. No.: 713,400

Related U.S. Application Data

[63] Continuation-in-part of Ser. No. 594,532, July 9, 1975, abandoned.
[52] U.S. Cl. .............................. 126/270; 165/166; 165/181
[51] Int. Cl.² ............................................ F24J 3/02
[58] Field of Search ................. 165/166, 179, 181; 126/270, 271; 237/1 A

[56] References Cited

UNITED STATES PATENTS

| | | | |
|---|---|---|---|
| 2,659,392 | 11/1953 | Frankel ............................. | 165/166 |
| 2,693,939 | 11/1954 | Marchant et al. ................. | 126/271 |
| 3,089,670 | 5/1963 | Johnson ............................. | 126/270 |
| 3,863,621 | 2/1975 | Schoenfelder ..................... | 126/270 |

FOREIGN PATENTS OR APPLICATIONS 621,392   2/1927   France ............................ 126/271

Primary Examiner—Kenneth W. Sprague
Attorney, Agent, or Firm—Merriam, Marshall, Shapiro & Klose

[57] ABSTRACT

An improved solar heat generator incorporates a novel finned heat-absorbing and transfer plate which employs upstanding fins of relatively small length which are arranged in uniformly spaced rows across the direction of gas flow, with the fins in each row laterally displaced a constant, relatively short distance from the position of the fins in the upstream adjacent row.

12 Claims, 5 Drawing Figures

U.S. Patent   April 26, 1977   4,019,494
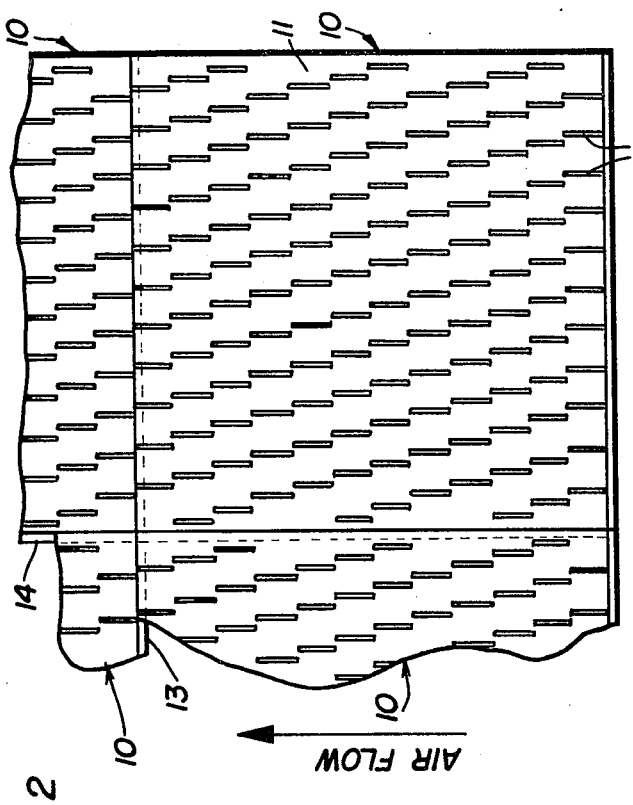
FIG.2
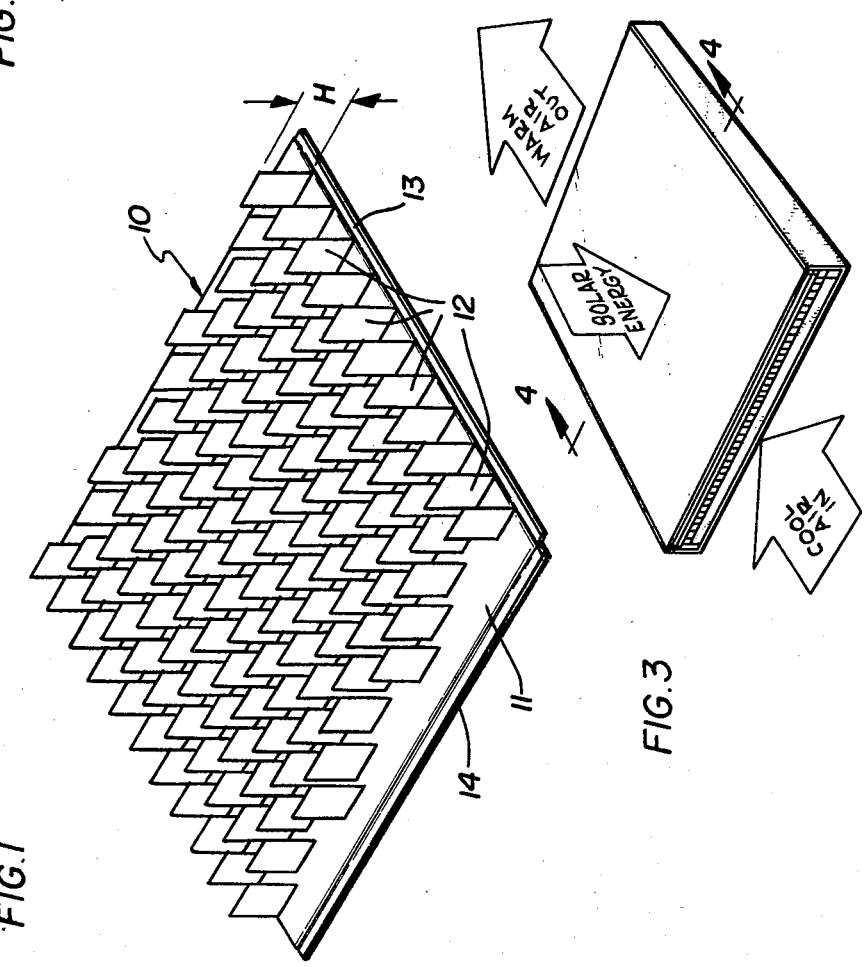
FIG.1
FIG.3
FIG.5
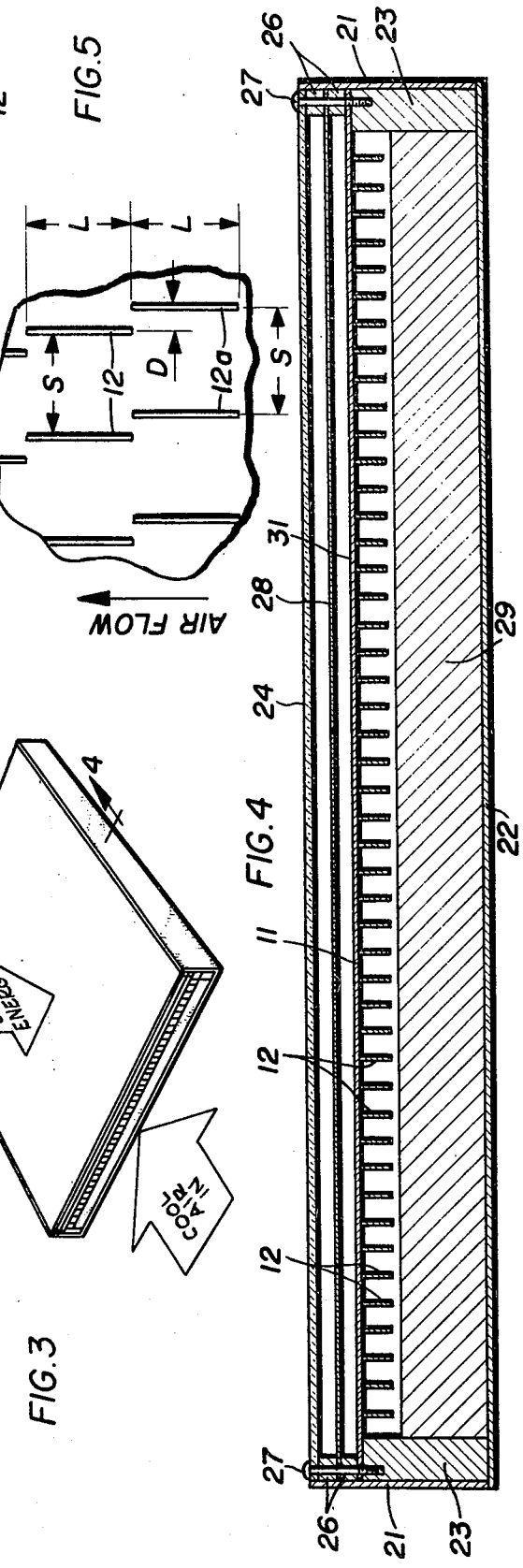
FIG.4

SOLAR AIR HEATER ASSEMBLY

This application is a continuation-in-part of my co-pending application Ser. No. 594,532, filed July 9, 1975, now abandoned.

This invention relates to an improved solar heater assembly for heating air or other gases having increased efficiency in the transfer of solar energy falling on the assembly to a gas stream and to an improved heat-exchange plate used in the assembly.

With the decreasing supply and consequently high cost of conventional fuels, increased attention is being given to solar energy as a substitute, at least in part, for other fuel sources for use in space heating homes and other structures. Many of the solar energy generators proposed for use in such applications are similar in their principle of operation. Typically, such a solar energy generator comprises a sheet of glass or other material which is transparent to the heat rays of the sun and which forms one side of a conduit for fluid flow. Below the transparent sheet, within the conduit, there is positioned a heat-conducting sheet or plate having a coating of a suitable dark material which absorbs the solar radiant energy which passes through the transparent sheet and converts the radiant energy to heat, causing the temperature of the plate to rise. A fluid, typically air or other gas, is passed through the conduit and is heated by contact with the energy-absorbing plate within the assembly. The heated stream of fluid which leaves the generator is then used in appropriate conventional fashion for heating a home or other building, or grain conditioning (corn drying, dehydrating alfalfa, etc).

The suitability of a solar heat generator of this type as a substitute for other energy sources depends on the efficiency with which the solar energy is collected and transferred to the stream of fluid, and also on the amount of power necessary to keep the stream of fluid moving through the generator. It is, of course, desirable to maximize the rate of heat transfer from the energy-absorbing plate to the fluid stream while minimizing the amount of power required to pass the fluid through the solar heater. The design of a solar heat generator which will achieve simultaneously both of these objectives presents a problem, however, since the conditions which tend to increase one effect tend to reduce the other. Thus, in order to maximize the rate of heat transfer between the energy-absorbing plate and the stream of fluid, the area available for heat transfer from the plate of the fluid should be relatively high. An increase in heat transfer area can be achieved in conventional fashion by the use of heat-conducting fins projecting from the surface of the heat-absorbing plate which contacts the fluid stream. While the use of fins produces a desirable increase in the area for heat transfer, however, such use has another effect which tends to reduce the overall heat transfer rate. This undesirable effect arises from the fact that when a fluid such as a gas flows generally parallel to and in contact with a stationary surface, such as a fin, there is always present at the interface between the surface and the gas stream a relatively stagnant boundary layer of gas which acts as insulation and tends to decrease the rate of heat transfer from the fin to the main body of gas. This stagnant boundary film layer tends to increase in thickness along the length of the fin in the direction of gas flow, and thus the insulating effect is greater at the downstream end of a fin that it is at the upstream end. Another disadvantage arising from the use of fins is that the friction between the gas stream and the fins increases the amount of power necessary to keep the stream of gas in motion at a given rate of flow. While the insulating effect of the boundary film layer can be reduced by limiting the length of the fins and arranging them in a staggered fashion in order to maintain a constant finned area, a staggered arrangement tends further to increase the frictional forces and hence the amount of power required for moving the gas stream.

In accordance with the invention, there is provided an improved solar heat generator incorporating a novel finned heat-absorbing and transfer plate which provides simultaneously a substantially improved rate of heat transfer and a relatively low increase in power requirement compared with an unfinned plate. The heat transfer plate employs a system of fins which are arranged in such manner that the insulating effect of the boundary layer of gas is reduced without, at the same time, unduly increasing the power required to move the gas stream. In general, the heat transfer plate of the invention employs fins of relatively small length which are arranged in uniformly spaced rows across the direction of gas flow, with the fins in each row laterally displaced a constant, relatively short distance from the position of the fins in the upstream adjacent row.

The invention will be better understood from the following detailed description thereof, taken in conjunction with the accompanying drawings, in which:

FIG. 1 is an isometric view of the heat exchange plate used in the invention, showing the fins extending outwardly from one side of the plate in staggered fashion;

FIG. 2 is a top view of the plate of FIG. 1, with portions of similar plates arranged at the top and left edges of the plate to form a larger composite plate structure;

FIG. 3 is an isometric view in schematic form of a typical solar air heater assembly employing the heat exchange plate structure of FIG. 2;

FIG. 4 is a sectional view along the line 4—4 of FIG. 3 showing the heat exchange plate in position in the solar air heater assembly; and FIG. 5 is an enlarged detail of a section of the plate shown in FIG. 2.

As shown in FIGS. 1 and 2, the invention comprises a heat exchange plate 10 having a flate base plate 11, to one surface of which are affixed a plurality of upstanding fins 12. Both base plate 11 and fins 12 are made of a thin, heat-conductive material, such as aluminum or other metal, the surface of which is adapted (e.g., polished) to aid in the transfer of heat from the plate to a stream of gas in contact therewith, in accordance with principles known to those skilled in the art. In the embodiment shown, each of fins 12 is square or rectangular, although it is also within the scope of the invention to use fins having other shapes, e.g., trapezoidal or arcuate. It should be understood when any dimension of a fin, such as its length, is referred to herein, the average dimension is intended.

As shown in FIG. 2, the fins 12 are arranged in rows extending transversely and preferably perpendicularly to the direction of air flow. While it is preferred that each of fins 12 be perpendicular to base plate 11, i.e., that the fin form an angle of about 90° with the base plate, it is also within the contemplation of the invention to use angles of attachment which differ from 90°. All of the fins in a row are generally parallel to the direction of air flow and equidistantly spaced along the row. The fins in any given row (e.g., 12, FIG. 5) are laterally displaced a constant distance D from the fins (e.g., 12a, FIG. 5) in the adjacent upstream row. The direction of displacement (i.e., right or left) is constant throughout the plate.

While the actual dimensions of the fins 12 used in a specific heat exchange plate 10 of the invention depend on the particular requirements, e.g., the heat load, the desired quantity of air to be heated, and the temperature to be achieved in the air stream, the relative dimensions of the fins and the spacing of the fins in the plate can be specified.

For an arrangement in which the spacing between adjacent fins 12 is S (FIG. 5), the length L (FIG. 5) of the fins is about 0.75 S to 5.0 S, and preferably about 1.0 S to 3.0 S, and the height H (FIG. 1) of the fin is about 1.0 S to 5.0 S and preferably about 1.375 S to 4.13 S, while the lateral displacement D (FIG. 5) between the fins in one row and the fins in the next adjacent row in the direction of air travel is about 0.1 S to 0.5 S and preferably within the range of about 0.125 S to 0.375 S.

In the preferred form of the invention shown in the figures, it will be seen that there is no overlap, in the direction of air travel, between the end of the fins in one row and the beginning of the fins in the downstream row, i.e., the projected ends of the fins in adjacent rows fall on a line. It is also contemplated, however, that an overlap of up to 0.1 S or a gap of up to 0.1 S between the ends of the fins in adjacent rows can also be used.

As seen in FIG. 1, two adjoining edges of base plate 11 are provided with offset lips 13 and 14, which permits a plurality of individual heat exchange plates 10 to be assembled with a free edge of base plate 11 resting on and supported by the lips 13 and 14 of adjacent plate assemblies. In this manner, a composite heat exchange surface can be made to any desired size by the use of individual plates such as that shown in FIG. 1. A portion of such an assembly is shown in FIG. 2, with each plate in turn supporting and being supported by the lips 13 and 14 on the individual plates. In such a construction, any suitable means of attachment between adjacent plates can be used, such as rivets, soldering, welding and the like.

As previously indicated, although the actual dimensions of the fins used in particular embodiments of the invention may vary, depending on the specific requirements of a particular use, the benefits of the invention will be obtained provided that the disclosed relative proportions in the height, spacing and displacement of the fins are observed. The greatest use of the invention will probably be found in space heating and cooling, grain conditioning, and the like. For the sizes of heat generator which will generally be useful for such purposes, it has been found that the spacing S between fins suitably on the order of 1 inch, with the other dimensions being in the proportions previously given.

A typical solar heat generator in accordance with the invention which is suitable for use in space heating and cooling of homes is illustrated in FIGS. 3 and 4. As shown, the generator comprises a frame consisting of side walls 21 and bottom 22, attached to side support members 23, all of which are suitably made of wood or other heat insulating material. At the top of the structure and spanning the distance between side walls 21 is a sheet 24 of glass, plastic, or other material which is transparent to solar energy. Sheet 24 is supported at its outer edges by insulating spacers 26 and held by conventional fasteners 27. As an optional feature which may be desirable for use of the invention in relatively cold climates, a second sheet 28 of transparent glass or plastic can be mounted a short distance below glass sheet 24. The layer of air between sheets 24 and 28 acts as an insulating zone to prevent the escape of heat from within the heat generator.

Mounted a short distance below sheet 28 is a heat exchange assembly such as that shown in FIG. 2, with the base plate 11 uppermost and fins 21 depending therefrom. The upper surface 31 of the assembly, i.e., the surface on which radiant energy passing through plates 24 and 28 will impinge, is preferably treated to facilitate the absorption of the radiant energy, as by coating with a flat black paint or other suitable material in a manner which is known to those skilled in the art. Disposed immediately below the lower edges of fins 21 is a layer 29 of a suitable heat-insulating material, such as glass fibre mats, used to prevent the escape of heat from the generator.

The assembly of FIG. 4 provides a conduit for air flow bounded on the top by sheet 24 (or, optionally, by sheet 28), on the bottom by the upper surface of insulation 29 and on opposite sides by insulating supports 23 and spacers 26. The conduit is suitably equipped with conventional inlet and outlet flow control means (not shown) for controlling the air flow. The air to be heated is introduced into the conduit in any appropriate manner and in passing therethrough comes into contact with the heat exchange plate assembly, which transfers the heat generated by absorption of the solar radiant energy to the stream of air, as indicated schematically in FIG. 3.

A typical assembly of the type illustrated in FIGS. 3 and 4 has a dimension of about 7 inches between glass plate 24 and the bottom 22 of the assembly; a spacing of about ¾ inch between plates 24 and 28 and between plate 28 and the top surface of heat exchange plate 10; fins 21 having a length and width of about 1 inch; a displacement distance between rows of fins of about ¼ inch; the width of the assembly being about 4 feet and the length about 8 feet. In the operation of such a heat generator, the efficiency of heat transfer from the plate to the stream of air is such that the bulk of air passing therethrough is heated to a temperature which approaches within about 10° F the temperature of the heat transfer plate. By comparison, under essentially the same conditions, but without the use of the fins in the heat exchange plate, the differential between the temperature of the plate and the air exceeds about 40° F. This increase in efficiency of heat transfer is achieved without any significant increase in power requirement.

The foregoing detailed description has been given for clearness of understanding only, and no unnecessary limitations should be understood therefrom, as modifications will be obvious to those skilled in the art.

What is claimed is:

1. A heat exchange plate adapted for heat transfer to a stream of fluid moving in a direction generally parallel to and in contact with a face of said plate, comprising:

a generally flat heat-conducting base plate;
 a plurality of flat thin heat-conducting fins attached to and extending outwardly from said face of said base plate;

said fins being arranged in a plurality of adjacent rows transverse to the direction of fluid flow, all of the fins in a row being generally parallel to the direction of fluid flow, the lateral spacing between adjacent fins in all rows being substantially constant, each row of fins being laterally displaced in one direction from the adjacent upstream row;

the lateral spacing between adjacent fins in a row being S, the length of the fins being about 0.75 S to 5.0 S, the height of the fins being about 1.0 S to 5.0 S, and the lateral displacement between fins in adjacent rows being about 0.1 S to 0.5 S.

2. A heat exchange plate in accordance with claim 1, in which the lateral spacing between adjacent fins in a row is S, the length of each fin is about 1.0 S to 3.0 S, the height of each fin is about 1.375 S to 4.13 S, and the lateral displacement between fins in adjacent rows is about 0.125 S to 0.375 S.

3. A heat exchange plate in accordance with claim 2, in which said fins are rectangular.

4. A heat exchange plate in accordance with claim 3, in which S has a value of about 0.75 to 1.25 inches.

5. A heat exchange plate in accordance with claim 3, in which the length of each fin is about 1 inch, the height of each fin is about 1 inch, the spacing between adjacent fins is about 1 inch, and the lateral displacement between adjacent rows is about 0.25 inch.

6. A heat exchange plate in accordance with claim 1, in which the face of said plate opposite to that on which said fins are attached is covered with a heat-absorbent surface coating.

7. A solar heat generating panel system comprising:
a first sheet of material which is transparent to solar radiant energy;
a heat exchange plate in accordance with claim 1 displaced from and arranged below and generally parallel to said sheet, said fins depending from the lower surface of said plate, the upper surface of said plate being adapted to absorb and convert to heat solar radiant energy impinging thereon;
a heat insulating material arranged below said heat exchange plate;
support means holding said sheet, said plate, and said insulating material in spaced-apart relationship, said support means defining together with said first sheet and said insulating sheet a conduit having an inlet through which a fluid to be heated can be introduced, and an outlet through which said fluid can exit.

8. A panel system in accordance with claim 7, including a second sheet of material which is transparent to solar radiant energy, said second sheet being arranged between and spaced from said first sheet and said heat exchange plate.

9. A panel system in accordance with claim 7, in which the lateral spacing between adjacent fins in a row is S, the length of each fin is about 1.0 S to 3.0 S, the height of each fin is about 1.375 S to 4.135 S, and the lateral displacement between fins in adjacent rows is about 0.125 S to 0.375 S.

10. A panel system in accordance with claim 9, in which said fins are rectangular.

11. A panel system in accordance with claim 10, in which S has a value of about 0.75 to 1.25 inches.

12. A panel system in accordance with claim 10, in which the length of each fin is about 1 inch, the height of each fin is about 1 inch, the spacing between adjacent fins is about 1 inch, and the lateral displacement between adjacent rows is about 0.25 inch.

* * * * *